Aug. 21, 1962 E. J. JOFFE 3,049,832
TWO-STAGE ROCKET
Filed April 22, 1958 2 Sheets-Sheet 1
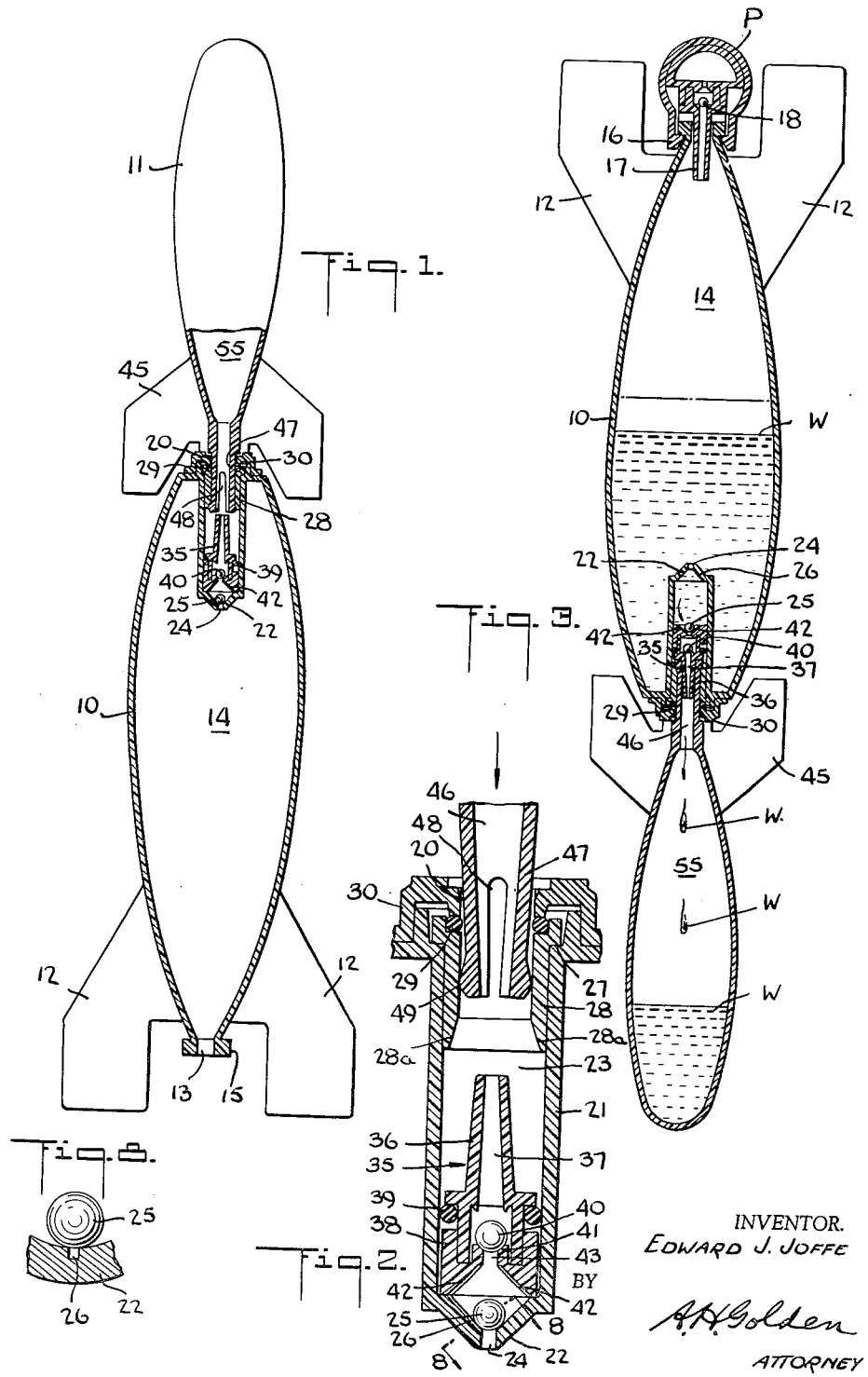
INVENTOR.
EDWARD J. JOFFE
BY
A. H. Golden
ATTORNEY Aug. 21, 1962  E. J. JOFFE  3,049,832
TWO-STAGE ROCKET
Filed April 22, 1958  2 Sheets-Sheet 2
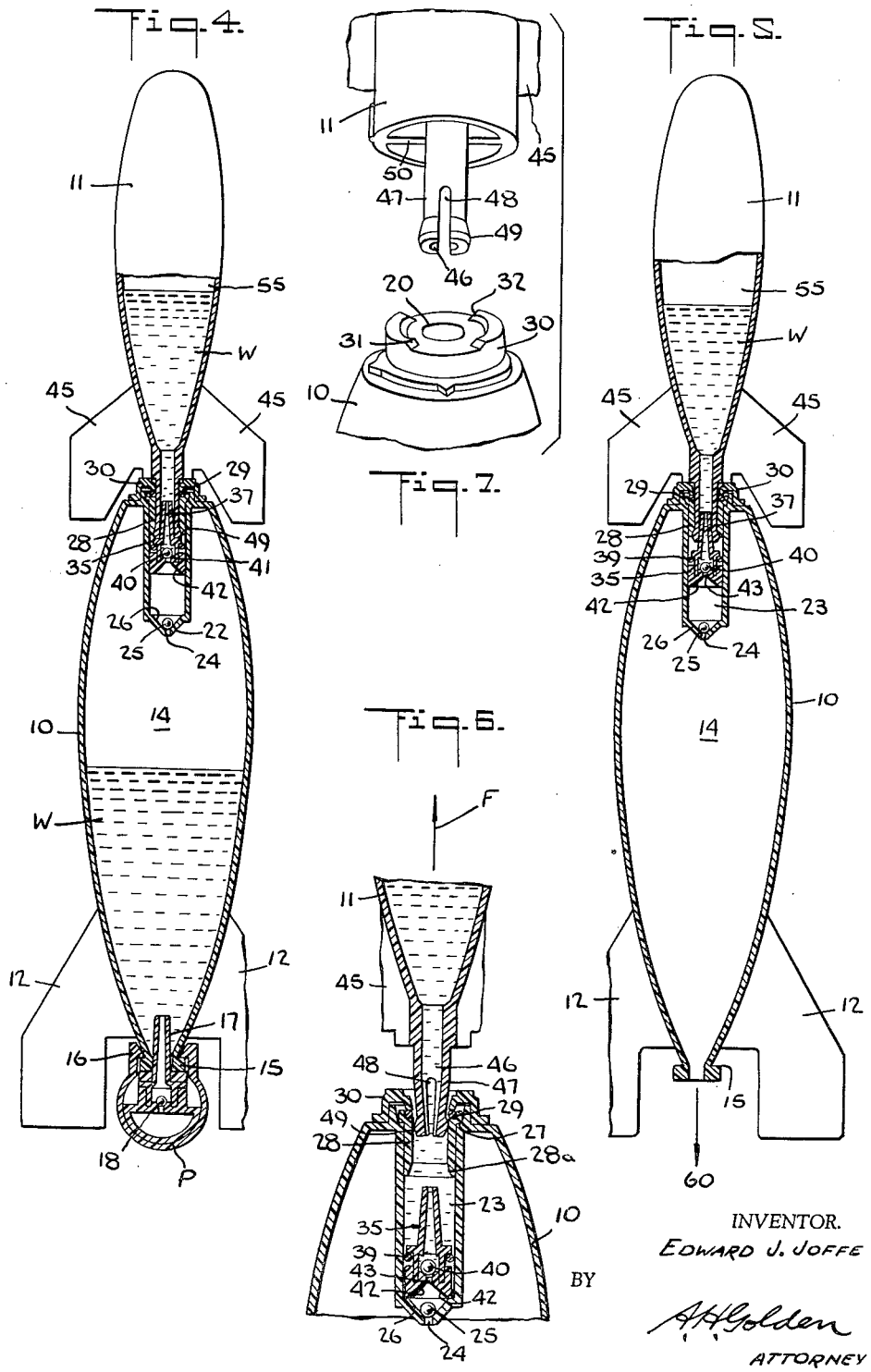
INVENTOR.
EDWARD J. JOFFE
BY
A. H. Golden
ATTORNEY

United States Patent Office 3,049,832
Patented Aug. 21, 1962

3,049,832
TWO-STAGE ROCKET
Edward J. Joffe, Summit, N.J., assignor to Park Plastics Co., Inc., Linden, N.J., a corporation of New Jersey
Filed Apr. 22, 1958, Ser. No. 730,202
17 Claims. (Cl. 46—74)

This invention relates to a toy rocket, and more particularly, to a toy rocket of the type in which an air pump is applied to a rocket-shaped body having therewithin a chamber in which may be contained a quantity of water. The operation of the pump forces air into the chamber through an outlet-inlet opening, placing the water under pressure for movement outwardly of the chamber through the opening. Upon release of the rocket from the pump, the air within the chamber forces the water outwardly through the opening and the rocket is launched for a rather considerable distance in the air, depending naturally upon the amount of air pressure that has been developed within the chamber.

My invention relates particularly to the type of rocket I have just described, but with the added feature of a second stage rocket that is adapted to be carried by the first stage rocket to a particular height and then released for further upward travel.

A basic feature of my invention resides in the utilization of means securing the two rockets for flight together, with the second stage rocket released from said means upon a decrease in pressure within the first stage rocket resulting from its flight. These securing means may take many forms, and I have conceived the use of several including a contractible container into which a part of the second stage rocket fits within the first stage rocket.

As a more particular feature of the invention, I utilize means actuated upon the application of pressure within the first stage rocket for locking or securing the two rockets for flight together, the relief of this pressure releasing the second stage rocket for flight relatively to the first stage rocket.

As a still further feature of my invention, I prefer to utilize a pressure-actuated piston, plunger, or detent member, as it may be termed, for locking the second stage rocket to the first stage rocket, the relief of pressure allowing this plunger, piston, or detent member to release the second stage rocket for flight.

As a still further feature of my invention, I utilize a one-way check valve through which air, or air and water, may be passed from the first stage rocket into the second stage rocket, this valve preventing reverse flow of air and water. Upon release of the second stage rocket because of the dropping of pressure in the first stage rocket, the pressure exerted against the one-way valve furnishes the reaction through which the second stage rocket takes off into flight and moves rapidly away from the first stage rocket. As a particular feature of this portion of my invention, means are present to slow down the release of the second stage rocket from the first stage rocket through controlling the dropping in the pressure. This is preferably accomplished by creating, in effect, two pressure chambers within the first stage rocket, the pressure in one chamber dropping rather slowly as the pressure in the other chamber drops rapidly, in this way effecting a time-controlled release of the second stage rocket.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings,

FIG. 1 is a vertical section through the toy of my invention, showing the first and second stage rockets assembled.

FIG. 2 illustrates enlarged, certain parts of FIG. 1 as they appear when the second stage rocket is moving into engagement with the first stage rocket.

FIG. 3 shows the assembly of FIG. 1 inverted and with water moving from the first stage rocket to the second stage rocket.

FIG. 4 shows the rockets again inverted to the position of FIG. 1 and with an air pump applied to the first stage rocket, the two rockets now being locked together.

FIG. 5 shows the pump removed from the first stage rocket and the first stage rocket in flight with the locking means about to release the second stage rocket.

FIG. 6 shows the second stage rocket just at the release point.

FIG. 7 is an exploded view showing the top of the first stage rocket and the lower portion of the second stage rocket.

FIG. 8 is a section taken along line 8—8 of FIG. 2, showing a detail of the construction.

Referring now more particularly to the drawings, the first stage rocket, hereinafter termed the first rocket in order to shorten the specification, is designated by reference numeral 10, and is of that general class illustrated in the patent to Krautkramer, No. 2,732,657, under which this toy rocket is now being manufactured. The second stage rocket, hereinafter to be termed the second rocket, is designated by reference numeral 11. The lower portion of the first rocket 10 is equipped with the usual fins 12 and an outlet 13 through which water is adapted to escape from the pressure chamber 14 of the rocket. The outlet 13 is flanged as at 15 so that a pump P may be applied to the first rocket, a part of the pump P being best shown in FIG. 3 or 4.

The construction of the pump P is not per se a part of this invention, and it is merely necessary to know that the pump P has portions 16 whereby it may be locked to the flange 15 while a nozzle 17 of the pump is within the chamber 14. A check valve 18 is positioned just below the nozzle 17 so that the flow of air into the chamber 14 is made possible while the movement of air and fluid out of the chamber is made impossible. The pump is so constructed that the movement of the portions 16 from the flange 15 will release the rocket for flight as hereinafter will appear, and as is well emphasized in the Krautkramer patent.

The rocket 10 is preferably made of plastic parts that are readily cemented together to form a unitary body. Those skilled in the art will appreciate that this type of structure is necessary in order to lower costs and make possible an inexpensive structure. However, the details of construction are merely incidental to my basic concept. Referring more particularly to FIGS. 1 and 2, as well as the lower part of FIG. 7, rocket 10 has an opening at its upper end as shown at 20 in FIG. 7. This opening is part of a cylindrical chamber 23 defined by a cylindrical wall 21 made integral with the main body of the rocket 10. The lower end of the cylindrical wall 21 extends into a surface 22 forming the bottom of the cylindrical chamber 23. A valve opening 24 is formed in the bottom 22 and on this rests a ball valve 25. As best shown in FIG. 8, a groove 26 is formed in the upper surface of the bottom 22, this groove functioning as a bleeder relatively to the ball valve 25 for reasons that will appear presently.

Resting on a shoulder 27 at the upper end of the cylindrical wall 21 is a cam sleeve 28. This cam sleeve can move upwardly slightly in the cylindrical chamber 23 by sliding on the cylindrical wall 21, and when it so moves, it compresses a rubber O-ring 29 as will appear quite clearly in FIG. 2. The limiting cap 30 is formed to prevent more than a slight movement of the cam sleeve 28, through the limiting relation between the cap and the O-ring 29. Cap 30 is itself formed with cam surfaces 31 and 32 as best illustrated in FIG. 7, it being understood further that this cap 30 is cemented to the body of the rocket 10 so as to form an integral part thereof, once the O-ring 29 and the cam sleeve 28 have been applied in place.

Mounted for sliding within the chamber 23 as best seen in FIG. 2 is a piston-like member that I prefer to term a locking means or plunger, it being the function of this plunger, designated generally by reference numeral 35, to lock or secure the second rocket to the first rocket, as will appear presently. The plunger 35, for convenience in fabrication, is formed of an upper part 36 that is tapered and equipped with a central tapered bore 37. This upper part is cemented so as to be integral with a lower part 38, once there has been assembled in position an O-ring 39 and a ball valve 40 seated on a seat 41 in part 38. Formed on the bottom of the part 38 are bleeder grooves 42 similar to the groove 26 on the bottom surface 22 of the cylindrical chamber 23 and leading to a port 43. The ball valve 25 is adapted to drop under certain circumstances toward the port 43, that being the port that is closed by the ball valve 40. However, because of the presence of the grooves 42, ball 25 will not seal the port 43. This will all appear very clearly presently.

As best shown in FIG. 7, the second rocket 11 is equipped with fins 45 and a nozzle 46 through which water flows under pressure so that the second rocket may be launched into the air. The cylindrical wall 47 defining the nozzle 46 is slotted at 48 to facilitate slight flexing or collapsing of the wall 47 for a reason to be set forth more clearly below. Further, the lower portion of the cylindrical wall 47 is tapered outwardly at 49 to facilitate interlocking of the second rocket and the first rocket. Ribs 50 are formed on the second rocket adjacent the upper end of the nozzle 46, these ribs coacting with the cams 31 of the cap 30, as will be hereinafter emphasized.

I shall now explain the operation of the structure that I have hereinabove set forth specifically. In FIG. 2 I show the cylindrical nozzle 46 of rocket 11 entering the cylindrical opening 23 of the first rocket. This is made possible through the inward flexing of the cylindrical wall 47 of the second rocket as will be quite apparent. Once the nozzle 46 is moved to the position illustrated in FIG. 1, the cylindrical wall 47 expands to its normal position illustrated in FIG. 7, and the cam surface 49 then lies against the tapered cam surface 28a of the cam sleeve 28. This is obviously the relationship of the parts in FIG. 1. Water is now moved into the chamber 14 of the first rocket 10 and the two rockets are inverted as shown in FIG. 3 and the pump P applied, as is also shown in FIG. 3.

The operation of the pump will effect the movement immediately of the plunger 35 from its position of FIG. 2 into its position of FIG. 3. This movement, accomplished by pressure applied to the plunger 35, moves the tapered portion 36 of the plunger 35 into the nozzle 46. It is quite obvious now that the nozzle 46 can no longer flex or collapse because of the presence of the slots 48, due to the presence of the plunger portion 36 within the nozzle. Therefore, the nozzle 46 cannot possibly move outwardly of the cylindrical chamber 23. The continued operation of the pump forces air and water toward the inner pressure chamber 55 of the second rocket, the drops of water being designated by the letter W in FIG. 3, the water itself also being designated by the letter W. The flow of the water and air is through the port 24, past ball valve 25 because of the presence of grooves 42, past the unseated ball valve 40, and through passage 37 in the plunger portion 36; then through the nozzle 46 into the pressure chamber 55 of the second rocket 11.

As soon as the water level has reached the position of FIG. 3 in both rockets, the rockets are then inverted to the position of FIG. 4 and the water assumes the position in the two rockets shown in FIG. 4.

It will be well at this time to indicate that preferably in order to prevent any escape of fluid between the two rockets when they are locked together as shown in FIG. 4, I rotate the two rockets relatively to one another slightly. This slight rotation causes the cam surfaces 31 and 32 to coact with the ribs 50 of the second rocket 11. This tends to move the upper rocket slightly upwardly away from the lower or first stage rocket in FIG. 4. This slight upward movement causes the cam surfaces 49 of the nozzle wall 47, best illustrated in FIG. 7, to push upwardly the cam sleeve 28 earlier described in more detail with regard to FIG. 2. The upward movement of the cam sleeve 28 compresses the O-ring 29 by forcing it against the cap 30. There is, therefore, an effective sealing of all of the parts so that the transmission of air into the second rocket to increase the pressure against the water therein is facilitated.

It will be noted that the pump in FIG. 4 is still in place relatively to the first rocket 10. Continued operation of the pump forces air through the water W in chamber 14 and up through passage 24, past ball valve 25, past check ball valve 40, which will obviously move off its seat 41 as can best be appreciated from the enlarged view in FIG. 2. The air will flow upwardly through passage 37 in plunger 35, and through the water W, in chamber 55 of the second rocket, thereby placing the water in the second rocket under considerable pressure.

Suppose that we now release the first rocket from the pump P by withdrawing the portions 16 from the flanges 15 surrounding the nozzle 13 of the rocket 10. This brings the parts to the position of FIG. 5. The air under pressure within the chamber 14 forces the water outwardly as indicated by the arrow 60 in FIG. 5 so that rocket 10 takes off into space, carrying with it rocket 11. The air pressure within the chamber 14 naturally drops very rapidly, and because of this, the pressure within the cylindrical chamber 23 below the plunger 35 will also drop, but at a relatively lower rate. This is due to the fact that air from the chamber 23 can only flow past the ball valve 25 through the very small bleeder grooves 26 which were explained in detail with reference to FIGS. 2 and 8.

As the pressure within chamber 23 drops slowly, the piston 35 will naturally be forced downwardly because of the pressure of the air within the chamber 55 acting against the water in the said chamber 55. This pressure will be exerted against the check valve 40, and the plunger 35 will be moved downwardly from the position of FIG. 5 toward the position of FIGS. 1, 2, and 6. It is to facilitate this movement through the confining of the pressure, that the O-ring 39 is utilized. Naturally, as the plunger 35 moves to its position of FIGS. 1, 2, and 6, it leaves the nozzle 46, thereby making it possible for the wall 47 of the nozzle to collapse as shown in FIG. 6. It will be remembered that the collapse of wall 17 made it possible for the nozzle 46 to enter the cylindrical chamber 23. Once the nozzle has collapsed or contracted, it is obviously released from the cam sleeve 28 and the cam surface 28a thereof, with the result that the pressure of the air within the chamber 55 against the water, effects the flight of rocket 11 as illustrated by arrow F in FIG. 6. In other words, the second rocket 11 takes off into space because of the reaction to the movement of the water outwardly of its nozzle 46, this flight being substantially the same as that of the first stage rocket 10.

Those skilled in the art will now appreciate that I contribute a two stage rocket assembly in which the first stage rocket takes off into flight. The controlled dropping of the pressure within the chamber 23 allows for the slow movement of the plunger 35 releasing the second stage rocket so that it may take off and leave the first stage rocket just at the time that the first stage rocket has reached its highest position.

I now claim:

1. A two-stage toy rocket comprising a first stage rocket having a fluid outlet at one end thereof and a pressure chamber, a second stage rocket having a fluid nozzle and a pressure chamber, said fluid nozzle of said second stage rocket fitting against an opening in the first stage rocket, said opening being at that end of the first stage rocket opposite the end where is positioned the fluid outlet locking means locking said rockets together, a valve through which air and liquid enter said second stage rocket through said nozzle from said first stage rocket when said rockets are locked together, said valve closing said nozzle against reverse flow outwardly of fluid therefrom when said rockets are locked together, and the air pressure in said second stage rocket acting against said locking means to actuate said locking means to release the second stage rocket from said first stage rocket when said air pressure in said second stage rocket is at a predetermined degree relatively to the air pressure in said first stage rocket.

2. A multiple stage toy rocket comprising a first stage rocket having a fluid outlet at one end thereof through which air is introduced under pressure into said rocket and an opening for a second stage rocket at its other end, a second stage rocket having a fluid outlet nozzle fitting into said opening in said first stage rocket for receiving air and liquid under pressure from said first stage rocket, a check valve preventing escape of air and liquid from said second stage rocket when it is secured to said first stage rocket while allowing entry of liquid and air into said second stage rocket from said first stage rocket, securing means actuated by pressure in said first stage rocket to secure the nozzle of said second stage rocket in the opening of said first stage rocket, and the relief of said pressure in said first stage rocket automatically releasing said second stage rocket from said securing means whereupon the liquid and air pressure in said second stage rocket effect flight of said second stage rocket.

3. A multiple stage toy rocket comprising a first stage rocket having a fluid outlet at one end thereof through which air is introduced under pressure into said rocket and an opening for a second stage rocket at its other end, a second stage rocket having a fluid outlet nozzle fitting into said opening in said first stage rocket for receiving air under pressure from said first stage rocket, a check valve carried by said first stage rocket and adapted to prevent escape of air and liquid from said second stage rocket when it is secured to said first stage rocket while allowing entry of liquid and air into said second stage rocket from said first stage rocket, securing means actuated by pressure in said first stage rocket to secure said second stage rocket to said first stage rocket, and the relief of pressure in said first stage rocket releasing said second stage rocket from said securing means and allowing the liquid and air pressure in said second stage rocket to react against said check valve to move said second stage rocket for flight away from said first stage rocket.

4. A multiple stage toy rocket comprising a first stage rocket having a fluid outlet at one end thereof through which air is introduced under pressure into said rocket and an opening for a second stage rocket at its other end, a second stage rocket having a fluid outlet nozzle fitting into said opening in said first stage rocket for receiving air and liquid under pressure from said first stage rocket, a check valve preventing escape of air and liquid from said second stage rocket when it is secured to said first stage rocket while allowing entry of liquid and air into said second stage rocket from said first stage rocket, securing means actuated by pressure in said first stage rocket to secure said second stage rocket to said first stage rocket, the relief of pressure in said first stage rocket releasing said second stage rocket from said securing means whereupon the liquid and air pressure in said second stage rocket actuates said second stage rocket for flight relatively to said first stage rocket, and means in said first stage rocket for controlling the release of said securing means to delay the release of said second stage rocket.

5. A multiple stage toy rocket comprising a first stage rocket having a fluid outlet at one end thereof through which air is introduced under pressure into said rocket and an opening for a second stage rocket at its other end, a second stage rocket having a fluid outlet nozzle fitting into said opening in said first stage rocket for receiving air under pressure from said first stage rocket, a check valve carried by said first stage rocket and adapted to prevent escape of air and liquid from said second stage rocket when it is secured to said first stage rocket while allowing entry of liquid and air into said second stage rocket from said first stage rocket, securing means actuated by pressure in said first stage rocket to secure said second stage rocket to said first stage rocket, the relief of pressure in said first stage rocket releasing said second stage rocket from said securing means and allowing the liquid and air pressure in said second stage rocket to react against said check valve to move said second stage rocket for flight away from said first stage rocket, and means in said first stage rocket for controlling the release of said securing means to delay its release of said second stage rocket.

6. A two-stage toy rocket comprising a first stage rocket having a fluid outlet at one end thereof and an internal pressure chamber in communication with said outlet, a second stage rocket having a similarly arranged fluid nozzle and a pressure chamber, said fluid nozzle of said second stage rocket fitting against an opening formed in the other end of said first stage rocket, moving means when in one position locking said fluid nozzle against movement away from said opening whereby to lock said rockets together, a valve carried by said moving means to permit air and liquid to enter said second stage rocket through said nozzle from said first stage rocket while closing said nozzle against flow outwardly of air and liquid therefrom, the air pressure in said second stage rocket acting through the liquid against said moving means to move said moving means out of locking position when the air pressure in said second stage rocket is at a predetermined degree relatively to the air pressure in said first stage rocket whereby to release said second stage rocket for flight by the ejection of liquid through its nozzle.

7. A two-stage toy rocket comprising a first stage rocket having a fluid outlet at one end thereof and an internal pressure chamber in communication with said outlet, a second stage rocket having a similarly arranged fluid nozzle and a pressure chamber, said fluid nozzle of said second stage rocket fitting against an opening formed in the other end of said first stage rocket, movable locking means, said locking means in one position locking said fluid nozzle against movement away from said opening whereby to lock said rockets together, said locking means in a second position releasing said nozzle from said opening, a valve carried by said locking means to permit air and liquid to enter said second stage rocket through said nozzle from said first stage rocket while closing said nozzle against flow outwardly of air and liquid therefrom, the air pressure in said second stage rocket acting against said locking means to move said locking means out of locking position when the air pressure in said second stage rocket is greater than the air pressure in said first stage rocket, whereby to release said second stage rocket for flight by the ejection of liquid through its nozzle.

8. A two-stage toy rocket comprising a first stage rocket having a fluid outlet at one end thereof and an internal pressure chamber in communication with said outlet, a second stage rocket having a similarly arranged fluid nozzle and a pressure chamber, said fluid nozzle of said second stage rocket fitting against an opening formed in the other end of said first stage rocket, movable locking means, said locking means in one position locking said fluid nozzle against movement away from said opening whereby to lock said rockets together, said locking means in a second position releasing said nozzle from said opening, a valve carried by said locking means to permit air and liquid to enter said second stage rocket through said nozzle from said first stage rocket while closing said nozzle against flow outwardly of air and liquid therefrom, the application of air and liquid pressure from said first stage rocket to force liquid and air into said second stage rocket moving said locking means to lock said rockets together, the air pressure in said second stage rocket acting against said locking means to move said locking means out of locking position when the air pressure in said second stage rocket is greater than the air pressure in said first stage rocket, whereby to release said second stage rocket for flight by the ejection of liquid through its nozzle.

9. A multiple stage toy rocket comprising a first stage rocket having a fluid outlet through which air is introduced under pressure into said rocket against liquid, a second stage rocket having a fluid outlet nozzle fitting into an opening in said first stage rocket for receiving air under pressure from said first stage rocket to act against liquid in said second stage rocket, a locking plunger movable relatively to said first stage rocket and the fluid nozzle of said second stage rocket, the pressure of air in said first stage rocket forcing said plunger into a position locking said nozzle against movement outwardly of said first stage rocket, a check valve in said plunger preventing escape of air and liquid from said second stage rocket, and the relief of pressure in said first stage rocket allowing the liquid and air pressure developed in said second stage rocket to move said plunger to release said second stage rocket for flight.

10. A multiple stage toy rocket comprising a first stage rocket having a pressure chamber and a fluid outlet through which air is introduced under pressure into said rocket against liquid in said chamber, a second stage rocket having a pressure chamber and a fluid outlet nozzle fitting into an opening in said first stage rocket for receiving air and liquid from said first stage rocket, a sliding plunger movably mounted on said first stage rocket for movement relatively to the fluid nozzle of said second stage rocket, said plunger when in said nozzle locking said rockets together, a check valve in said plunger, said valve preventing escape of air and liquid from said second stage rocket through said nozzle when said nozzle is closed by said plunger while allowing entry of liquid and air into said rocket from said first stage rocket, the pressure of air and liquid in said first stage rocket forcing said plunger into said nozzle to lock said nozzle against movement outwardly of said first stage rocket, the relief of pressure in said first stage rocket allowing the liquid and air pressure in said second stage rocket to move said plunger outwardly of said nozzle to release said second stage rocket for flight, and a valve in said first stage rocket for controlling the release movement of said plunger by the pressure in said second stage rocket whereby to delay release of said nozzle and the separate flight of said second stage rocket.

11. A multiple stage toy rocket comprising a first stage rocket having a fluid outlet through which air is introduced under pressure into said rocket against liquid, a second stage rocket having a fluid outlet nozzle fitting into an opening in said first stage rocket for receiving air under pressure from said first stage rocket to act against liquid in said second stage rocket, a locking plunger movable relatively to said first stage rocket for locking and releasing said second stage rocket relatively to said first stage rocket, a check valve carried by said plunger, said valve preventing escape of air and liquid from said second stage rocket through said nozzle when said second stage rocket is locked to said first stage rocket by said plunger, said valve allowing entry of liquid and air into said second stage rocket from said first stage rocket, the pressure of air and liquid in said first stage rocket initially forcing said plunger into a position locking said nozzle against movement outwardly of said first stage rocket, and the relief of pressure in said first stage rocket allowing the liquid and air pressure in said second stage rocket to move said plunger to release said second stage rocket for flight.

12. A multiple stage toy rocket comprising a first stage rocket having a fluid outlet through which air is introduced under pressure into said rocket against liquid, a second stage rocket having a fluid outlet nozzle fitting into an opening in said first stage rocket for receiving air under pressure from said first stage rocket to act against liquid in said second stage rocket, a locking plunger movable relatively to said first stage rocket for locking and releasing said second stage rocket relatively to said first stage rocket, a check valve carried by said plunger, said valve preventing escape of air and liquid from said second stage rocket through said nozzle when said second stage rocket is locked to said first stage rocket by said plunger, said valve allowing entry of liquid and air into said second stage rocket from said first stage rocket, the pressure of air and liquid in said first stage rocket initially forcing said plunger into a position locking said nozzle against movement outwardly of said first stage rocket, the relief of pressure in said first stage rocket allowing the liquid and air pressure in said second stage rocket to move said plunger to release said second stage rocket for flight, and a valve in said first stage rocket for controlling the release movement of said plunger by the pressure in said second stage rocket whereby to delay release of said nozzle.

13. A multiple stage toy rocket comprising a first stage rocket having a fluid outlet at one end thereof through which air is introduced under pressure into said rocket against liquid, a second stage rocket having a fluid outlet nozzle fitting into an opening formed in the other end of said first stage rocket for receiving air under pressure from said first stage rocket to act against liquid in said second stage rocket, securing means carried by said first stage rocket to secure said second stage rocket with its nozzle in said opening, a check valve, said valve preventing escape of air and liquid from said second stage rocket through said nozzle when said nozzle is held in said opening while allowing entry of liquid and air into said rocket from said first stage rocket, the pressure of air and liquid in said first stage rocket actuating said securing means to hold said nozzle against movement outwardly of said first stage rocket opening whereby air under pressure may be directed into said second stage rocket as it is secured to said first stage rocket, the relief of pressure in said first stage rocket releasing said second stage rocket from said securing means, whereupon the liquid and air pressure in said second stage rocket reacts against said valve to launch said second stage rocket into flight.

14. A multiple stage toy rocket comprising a first stage rocket having a fluid outlet at one end thereof through which air is introduced under pressure into said rocket against liquid, a second stage rocket having a fluid outlet nozzle fitting into an opening formed in the other end of said first stage rocket whereby said second stage rocket receives air under pressure from said first stage rocket to act against liquid in said second stage rocket, securing means carried by said first stage rocket to secure said second stage rocket with its nozzle in said opening, a check valve, said valve preventing escape of air and liquid from said second stage rocket through said nozzle when said nozzle is held in said opening while allowing entry of liquid and air into said rocket from said first stage rocket, the pressure of air and liquid in said first stage rocket actuating said securing means to hold said nozzle against movement outwardly of said first stage rocket opening whereby air under pressure may be directed into said second stage rocket as it is secured to said first stage rocket, the relief of pressure in said first stage rocket releasing said second stage rocket from said securing means, whereupon the liquid and air pressure in said second stage rocket reacts against said valve to launch said second stage rocket into flight, and a valve in said first stage rocket for controlling the release movement of said securing means by the pressure in said second stage rocket whereby to delay release of said nozzle.

15. A two-stage toy rocket comprising a first stage rocket having a fluid outlet and a pressure chamber, a second stage rocket having a fluid nozzle and a pressure chamber, said fluid nozzle of said second stage rocket fitting against an opening in the first stage rocket, a detent moved by air pressure in said first stage rocket when air is pumped into said first stage rocket through said fluid outlet, means whereby said detent locks said rockets together, means for introducing air and liquid under pressure into said second stage rocket, and means whereby the air pressure in said second stage rocket acts against said detent to move said detent to release the second stage rocket from said first stage rocket when the air pressure in said second stage rocket is high relatively to the air pressure in said first stage rocket through the escape of fluid from said fluid outlet of said first stage rocket.

16. A two-stage toy rocket comprising a first stage rocket having a fluid outlet and a pressure chamber, a second stage rocket having a fluid nozzle and a pressure chamber, said fluid nozzle of said second stage rocket fitting against an opening in the first stage rocket for receiving air and liquid from said first stage rocket, a detent moved by air pressure in said first stage rocket when air is pumped into said first stage rocket through said fluid outlet, means whereby the movement of said detent locks said rockets together through locking said fluid nozzle within said opening, and means whereby the air pressure in said second stage rocket acts against said detent to move said detent to release the nozzle from said first stage rocket opening when said air pressure in said second stage rocket is high relatively to the air pressure in said first stage rocket through the escape of fluid from said first stage rocket incidental to the flight of said first stage rocket, whereupon said second stage rocket takes flight through escape of fluid from its nozzle.

17. A rocket including at least two stages comprising in combination, a first stage including a storage vessel for pressurized fluid, said vessel having a fluid discharge outlet for propelling said rocket formed in a portion thereof, a second stage including a storage vessel for pressurized fluid, said vessel having a fluid discharge outlet for propelling said rocket formed in a portion thereof, means responsive to the pressure of said first stage for holding said first and second stages in engagement after pressurization with said first and second stage outlets not in engagement, said holding means having a normally released condition, and an operated condition, the pressure in said first stage prior to launching of said rocket causing said holding means to change from said released to said operated condition, said holding means maintaining said first and second stages in engagement when in said operated condition, and said second stage being released from said first stage when the pressure in said first stage diminishes sufficiently so that said holding means is no longer maintained in said operated condition.

References Cited in the file of this patent
UNITED STATES PATENTS

| | | |
|---|---|---|
| 2,700,337 | Cumming | Jan. 24, 1955 |
| 2,829,491 | Teague | Apr. 8, 1958 |

FOREIGN PATENTS

| | | |
|---|---|---|
| 161,579 | Australia | Mar. 1, 1955 |